United States Patent [19]

Zweegers

[11] 4,128,987
[45] Dec. 12, 1978

[54] AGRICULTURAL IMPLEMENTS

[76] Inventor: Petrus W. Zweegers, Nieuwendyk 46, Geldrop, Netherlands

[21] Appl. No.: 744,596

[22] Filed: Nov. 24, 1976

[30] Foreign Application Priority Data

Nov. 8, 1976 [AT] Austria .................................. 8266/76

[51] Int. Cl.² ............................................ A01D 77/06
[52] U.S. Cl. .......................................... 56/377; 56/366; 56/370
[58] Field of Search ................. 56/365, 366, 367, 370, 56/375, 376, 377

[56] References Cited

U.S. PATENT DOCUMENTS

| | | | |
|---|---|---|---|
| 3,952,489 | 4/1976 | van der Lely | 56/370 |
| 3,992,862 | 11/1976 | van der Lely et al. | 56/370 |
| 3,992,863 | 11/1976 | van der Lely et al. | 56/370 |
| 4,015,411 | 4/1977 | van der Lely | 56/366 |

*Primary Examiner*—Russell R. Kinsey
*Attorney, Agent, or Firm*—Edmund M. Jaskiewicz

[57] ABSTRACT

In a haymaking machine having two staggered rotors with substantially vertical axes, the tine groups on the circumference of the rotors each comprise one or more fixed upper tines and one lower tine which can yield upwardly. Preferably, the number of tine groups of the forward rotor is one half the number of tine groups of the rearward rotor and there is a single, upwardly yielding tine between every two successive tine groups of the forward rotor. Preferably, the tines extend through slots in a closed cap.

23 Claims, 4 Drawing Figures

AGRICULTURAL IMPLEMENTS

This invention relates to a haymaking machine having one or more rotors rotatable about upright axes, each rotor having tine groups distributed about its circumference, said tine groups having superposed tines which extend outwards with respect to the axis of rotation of the rotor.

It is known in such a haymaking machine to pivotally connect each tine group as a unit with the rotor to enable their adaptation to the ground surface. However, a sufficient adaptation is not always obtained. It is an object of the invention to provide improvement in this respect.

This object is attained according to the invention in that each tine group comprises at least one upper fixed tine and a lower tine pivotable about an axis extending substantially in circumferential direction of the rotor.

This provides a substantial decrease of the pivoting mass with respect to tine groups which pivot as a unit so that the inertia of the tine when following ground irregularities is also strongly decreased and the tine can follow such irregularities faster and more accurately or in other words, a better adaptation is obtained. Moreover, the rotor operates smoother than in a device in which each tine group makes swinging movements as a unit during operation.

It is preferred that the lower, pivoting tine of each tine group is upwardly loaded by a spring, the centrifugal force acting against the spring force to hold the tine in a position of operation in which it is outwardly and downwardly inclined with respect to a plane normal to the axis of rotation of the rotor.

Because of the opposite directions of spring force and centrifugal force, the lower tine is held in the downwardly inclined position of operation by a very small resultant force so that it reacts even faster and more accurately to surface irregularities.

The invention may advantageously be used in a haymaking machine having two adjacent rotors in staggered positions, which rotate in equal directions, the forward rotor rotating at its front side toward the rearward rotor. Such a machine is used for lateral displacement of the hay on the field until it formes a swath laterally of the machine, which makes it essential that all hay is indeed laterally displaced, as distinct from machines used for tedding or turning the hay. By using the invention in this type of machine one achieves that no hay is left behind on the field.

In the latter type of machine it has been discovered that the number of tine groups of the forward rotor should preferably be lower than the number of tine groups of the rearward rotor. This prevents a disadvantageous influence on the operation of the rearward rotor by an excessive throw of the hay by the forward rotor in the direction of the rearward rotor.

The invention will now be elucidated with reference to the accompanying drawings.

Figure 1:
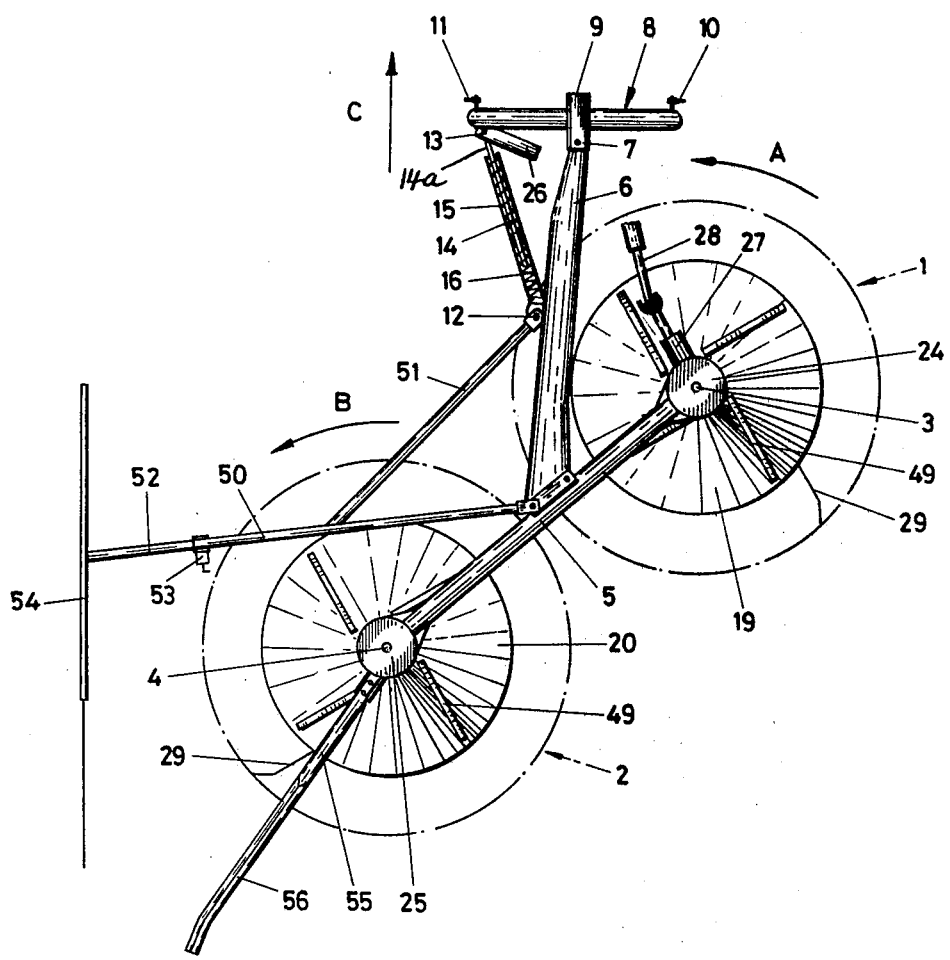
FIG. 1 is a plan view of an embodiment of a haymaking machine according to the invention.

The rotors 1 and 2 are mounted so as to be rotatable about upright axes 3 and 4 to the two ends of a supporting beam 5 which is inclined to the intended direction of movement (arrow C in FIG. 1) and the centre of which is connected to the rearend of a drawbeam 6 extending almost in the intended direction of movement, the forward end of the latter beam being connected, via a vertical pivot 7, to a coupling frame 8 provided with connecting parts 9, 10, 11 for connection to the three point lifting device of an agricultural tractor.

By means of a lug 12 mounted about in the middle of the drawbar 6 there has been coupled pivotally the end of a tube 14 to said drawbar. In said tube there is a rod 14a, the free end of which is situated outside and the tube being pivotally coupled to a lug 13 mounted on the left side of the couplng frame 8. In the tube 14 there are two compression springs 15 and 16 abutting against opposite faces of a disc fixed to the rod 14a.

Further there has been provided a latch 26, one end of said latch being pivotally connected to the lug 13. When the rod 14a has been withdrawn over part of its length from the tube 14 against the bias of spring 15, the free end of the latch can be brought into abutment with the end of the tube 14 for immobilizing the tube 14 with respect to the rod 14a. Supporting wheels 17 and 18 on which the machine runs over the field are mounted under the rotors 1 and 2. When the machine is towed over the field by a tractor, it can swing or yield to the right and to the left against the force of the spring 15 or 16 respectively.

Each rotor 1 or 2 respectively has a conical cap 19 or 20 respectively which merges with a lower cylindrical skirt 21 or 22 respectively. The supporting wheel 17 or 18 respectively is mounted for free rotation under the cap 19, 21 or 20, 22 respectively. The supporting wheels 17 and 18 can be fixed in position but can also be permitted to swivel. The caps 19, 21 and 20, 22 may be supported by a e.g. tubular frame, a part 23 of which is visible in FIG. 4. The caps 19, 21 and 20, 22 and their frame 23 are rotatably journalled at the underside of driving heads or gear transmission boxes 24, 25 fixed to the two ends of the supporting beam 5. The driving heads 24, 25 contain drive gears for the rotors 1 and 2 and these gears are coupled by a shaft extending through the supporting beam 5. The driving head 24 is provided with a connection 27 for a telescopic driving shaft 28 equipped with universal joints and being adapted to be connected to a tractor drive shaft. The gears in the driving heads 24 and 25 are so arranged that both rotors 1 and 2 are driven in the same sense, namely in the direction of the arrows A and B in FIG. 1, so that as seen in the intended direction of movement of the implement the forward portion of rotor 1 rotates toward rotor 1 and the forward part of rotor 2 rotates away from rotor 1.

Tine groups 29 are regularly distributed over the circumference of the rotors 1 and 2. The word tine group is intended to designate at least two superposed tines. The number of tine groups 29 on the forward rotor 1 is smaller than the number of tine groups on the rearward rotor 2 and is preferably one half the number of tine groups of the rearward rotor 2. In a preferred embodiment, the forward rotor 1 carries eight tine groups, whereas the rearward rotor 2 carries 16 tine groups.

Figure 2:
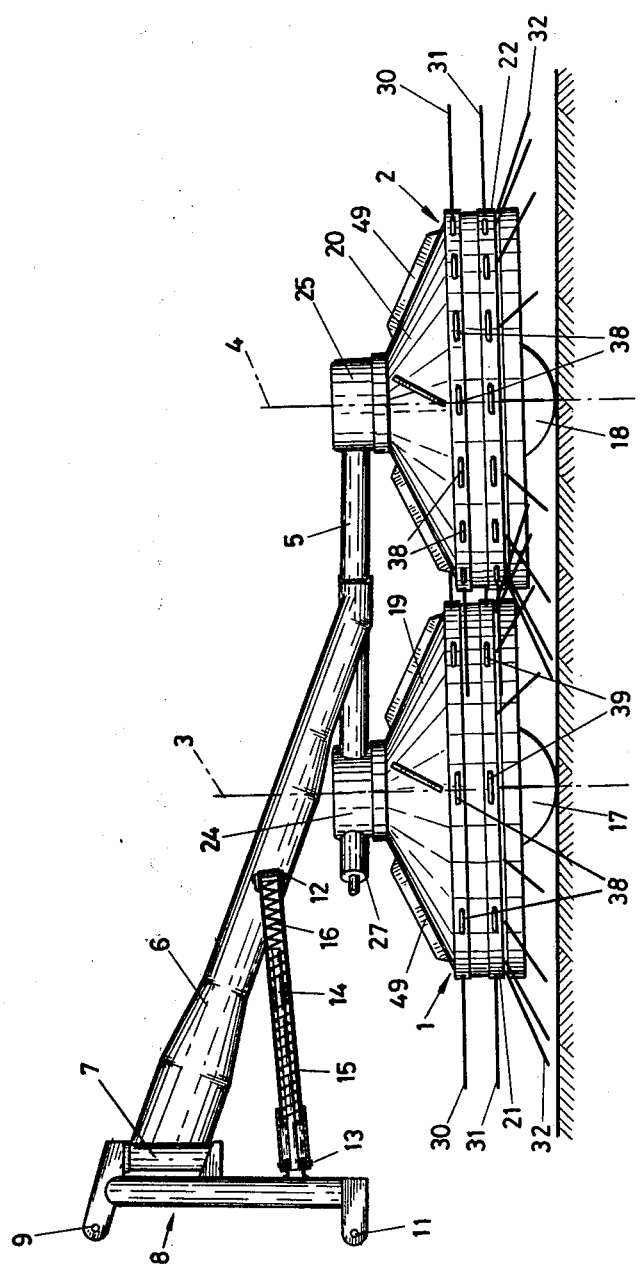
FIG. 2 is a side elevational view of the machine according to FIG. 1.
Figure 3:
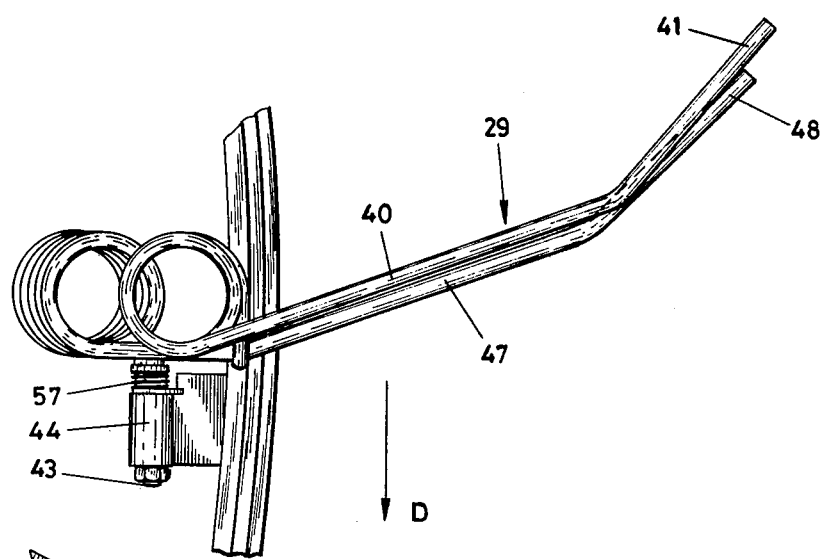
FIG. 3 is a plan view of a tine group.

In the embodiment described, each tine group 29 (see FIG. 4) comprises three superposed tines 30, 31 and 32. The inner ends of the two upper tines 30 and 31 are formed as coils 33 and 34 and the other ends of these coils are united by a connecting piece 35 which is fastened by a bolt 36 to a ring 37 which forms a part of the frame 23. The two upper fixed tines 30 and 31 extend through a slot 38 or 39 respectively FIGS. 2 and 4 in the lower cylindrical skirt 21 of the cap 19 of the rotor. The two upper tines 30 and 31 extend parallel to each other in planes normal to the axes of rotation 3 or 4 respectively of the rotor. When viewed from above, the inner portion 40 of the two tines 30 and 31 extends rearwardly relative to the direction of rotation D (FIG. 3) of the rotor at a small angle with respect to a radius extending outwards from the axis of rotation 3 or 4 respectively of the rotor. The outer portion 41 of the tines 31 and 32 is bent rearwardly at a larger angle with respect to said radius.

The lower tine 32 of each tine group is preferably made of thicker spring steel than the upper tines 30 and 31 and its inner and is also formed as coils 42. The other end of these coils 42 is bent into an eye which is rotatably fastened on one end of a bolt 43 extending tangentially to a circle, the centre of which is located near the axis of rotation 3 or 4 respectively of the rotor. The bolt 43 is fastened in a bracket 44 fixed to a lower ring shaped part 45 of the frame 23 closely spaced from an attached a the ring-shaped skirt 21 of the cap so that a narrow annular gap 46 is formed between said parts 45 and 21. The lower tines 32 extend outwardly through this annular gap 46. The shape of the outwardly extending part of the tines 32 is about equal to the shape of the outwardly extending part of the fixed tines 30 and 31. Thus, the outwardly extending part of the tines 32 has an inner portion 47 which is rearwardly inclined to the direction of rotation at a small angle with respect to a radius of the rotor, and an adjacent outer portion 48 rearwardly bent at a larger angle.

Figure 4:
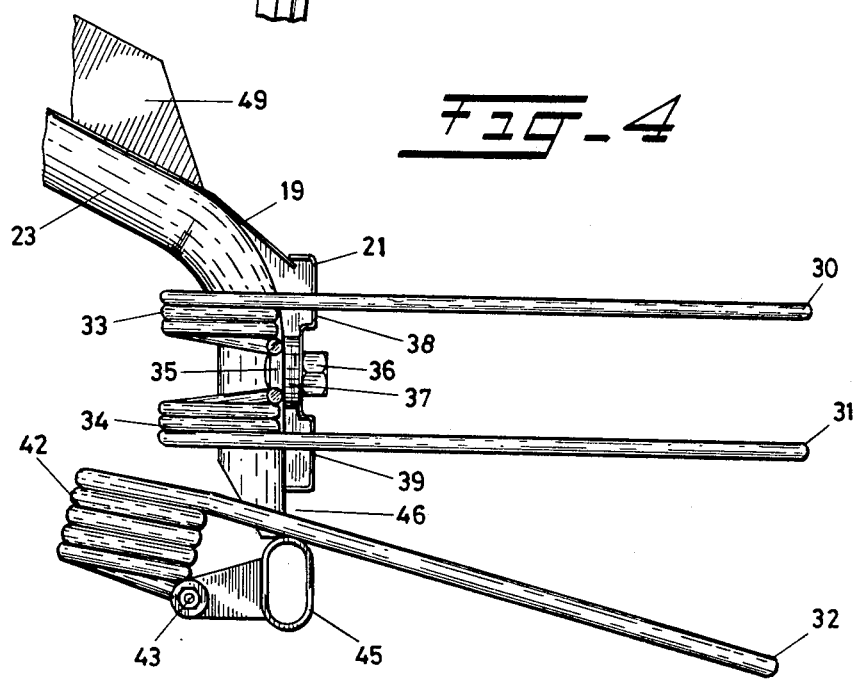
FIG. 4 is a front view of the tine group according to FIG. 3, part of the rotor being visible in section.

Between the bracket 44 and the eye shaped inner end of the tine 32, a coil spring 57 is mounted on the bolt 43 so as to exert a spring force on the tine 42 circumferentially of the bolt 43 and anticlockwise in FIG. 4. When the rotor 1 or 2 is stationary this force holds the tine 32 upwards against the lower edge of the cylindrical skirt 21 of the cap. However, the mass of the tine 32 and of its coil 42 is so distributed that in operation the centrifugal force caused by the rotation of the rotor 1 or 2 acts in opposed direction to the force of the spring 57 and dominates this force so that during operation the tine 32 is held downwards against the upper edge of the tubular frame ring 45.

The force of the spring 57 is so chosen with respect to the distribution of the mass of the tine 32 that the resultant force of centrifugal force minus spring force during operation is small so that the tine 32 is held against the upper edge of the tube 45 by a small force. As soon as the rotational speed of the rotor decreases, the spring force becomes dominant again to lift the tine 32 from the tube 45.

The forward rotor 1 which counts only eight groups 29 of three tines 30, 31, 32 carries centrally between every two successive tine groups 29 an additional single pivoting tine corresponding to the tines 32. Thus, in this embodiment the forward rotor counts 16 regularly distributed tines 32 but only eight pairs of tines 30, 31.

The conical cap 19 and 20 respectively of the rotor 1 and 2 respectively carries four regularly distributed, upwardly and downwardly extending upstanding ribs 49. These ribs are somewhat eccentrically positioned in this embodiment.

A supporting rod 50 extends from the connection of the supporting beam 5 with the draw beam 6 over the rearward rotor 2 to a position laterally outwards of this rotor. The rod 50 is supported by a second rod 51 mounted between an intermediate point of the rod 50 and the lug 12 of the draw beam 6. The outer portion of the hollow rod 50 contains a telescopically slidable part 52 which can be fixed in several positions by a clamp 53. A swath board 54 extends in the direction of movement and is fixed to the outer end of the outwardly extending slidable part 52. If desired, the swathboard 54 can be composed of two parts adjustably fixed to one another.

A further supporting rod 55 extends obliquely rearward from the driving head of the rearward rotor 2 and an auxiliary swath board 56 is fixed to the rear end of the rod 55 so as to extend in line therewith. If desired, the rod 55 and/or the auxiliary swath board 56 can be adjustably mounted.

The rotors 1 and 2 are fastened via their driving heads 24 and 25 to the supporting beam 5 in such a manner that the upper ends of their rotational axes 3 and 4 are inclined forwardly at a small angle, e.g. about 3°, to the vertical. The upper ends of the rotational axes 3 and 4 may also be laterally inclined with respect to the vertical at a small angle (e.g. 2° to 3°), preferably to the right with respect to the direction of movement.

When the device described is pulled over the field by a tractor, the crop lying on the field, such as hay, is engaged by the tines of the two rotors 1 and 2 and displaced from the right to the left as seen in FIG. 1. The crop displaced by the forward rotor 1 is moved into the path of the rearward rotor 2. The crop lying on the field in front of the rearward rotor 2 end the crop moved into the path of the rearward rotor 2 by the forward rotor 1 is displaced by the rearward rotor 2 towards and against the swathboard 54 and with respect to the forward movement of the device, the swath subsequently passes between the swathboard 54 and the outward side of the rotor 2 and then along the side of the auxiliary swathboard 56 and after passing the rear edges of the swathboards 54 and 56, the crop remains on the field in the shape of a high, compact swath. The numbers of tine groups on the rotors 1 and 2 respectively are so chosen that a proper operation is obtained and it is prevented that the rotor 1 throws the crop too vigourously toward the rotor 2. The fully closed caps 19 and 20 of the rotors 1 and 2 prevent that the crop clings to the tine mountings and other frame parts. The ribs 49 on the caps 19 and 20 also contribute to immediately throw away crop which falls on the caps. The lower tines 32 of both rotors, which slide over the ground, have a small mass and such a small inertia that they return immediately to their proper position of operation afther a yielding movement because of passing a surface irregularity. This provides for an excellent surface adaptation so that practically no crop remains on the field. Notwithstanding the small size of the device, it has a large capacity since it can be moved at high speed over the field. Since the lower tines 32 are upwardly spring biassed they will move upwards as soon as the speed of the device drops below a predetermined limit. Thus, they are always free from the ground when the rotors 1 and 2 do not rotate and any danger that the lower tines 32 are forced into the ground when the device is moved with stationary rotors 1 and 2 is avoided.

Although the described embodiment is preferred, other embodiments are also possible. The frame 5, 6, 8 may e.g. have an other design or shape or it may be moved in an other way. The tine groups 29 may e.g. each comprise more than two fixed tines 30, 31 and their individual tines may have different shapes. Several parts of the device may be adjustable, e.g. the angle between the drawing beam 6 and the supporting beam 5, and the direction of rotation of the rotor 1 and/or the rotor 2 may be reversible. The tines 30, 31, 32 of the rotor 1 and/or 2 may be adjustable in circumferential direction or in any other direction and the inclination of the rotational axes 3 and 4 may be adjustable.

What I claim is:

1. A haymaking machine comprising one or more rotors rotatable about upright axes of rotation, a plurality of tine groups distributed about the circumference of each rotor, each tine group comprising a plurality of superposed tines extending outwardly with respect to the axis of rotation of the rotor, said tines in each tine group comprising a first tine having a fixed mounting on the rotor in the working position and a second tine at a level lower than said first tine, and means on said rotor for pivotally mounting said second tine on a pivot axis near the circumference of the rotor and extending substantially tangentially to a circle having its center on the axis of rotation of the rotor.

2. A haymaking machine as claimed in claim 1 and further comprising a spring mounted between said rotor and said second tine urging said second tine upwardly such that when the rotor is rotating during operation the centrifugal force exerted by said second tine against said spring will hold said second tine in a position which is outwardly and downwardly inclined with respect to a plane normal to the axis of rotation of the rotor.

3. A haymaking machine as claimed in claim 1 in which each tine group comprises two upper fixed tines and one lower pivotable tine.

4. A haymaking machine as claimed in claim 3, in which the fixed tines extend substantially in planes normal to the rotational axis of the rotor.

5. A haymaking machine as claimed in claim 1 in which the tines of each tine group are rearwardly inclined with respect to the direction of rotation of the rotor.

6. A haymaking machine as claimed in claim 1 in which the outer part of the length of the tines is bent rearwardly with respect to the direction of rotation of the rotor.

7. A haymaking machine as claimed in claim 1 in which the inner ends of the tines are wound to define spring coils.

8. A haymaking machine as claimed in claim 1 wherein each rotor has thereon a closed cap with slots, the tine mountings being fully enclosed within said closed cap and the tines extend outwardly through slots of the cap.

9. A haymaking machine as claimed in claim 8, in which the lower tines extend outwardly through an annular slot formed between the lower edge of the cap and a tine supporting ring of the rotor frame.

10. A haymaking machine as claimed in claim 8 in which the slots through which the upper tines protrude are formed in a cylindrical skirt of the cap.

11. A haymaking machine as claimed in claim 10, in which the cylindrical skirt merges with a conical top of the cap which carries ribs extending upwardly and downwardly.

12. A haymaking machine as claimed in claim comprising two adjacent rotors om staggered positions and which rotate in equal directions, the forward rotor rotating at its front side toward the rearward rotor.

13. A haymaking machine as claimed in claim 12, in which the number of tine groups of the forward rotor is lower than the number of tine groups of the rearward rotor.

14. A haymaking machine as claimed in claim 13, in which the number of tine groups of the forward rotor is one half the number of tine groups of the rearward rotor.

15. A haymaking machine as claimed in claim 14, in which a single tine is mounted centrally between every two successive tine groups of the forward rotor.

16. A haymaking machine as claimed in claim 15, in which the single tine mounted between the successive tine groups is pivotable about an axis extending substantially tangentially to a circle having its center on the axis of rotation of the rotor.

17. A haymaking machine as claimed in claim 16 and comprising a second spring urging upwardly the single tine mounted between the successive tine groups such that said single tine is held by the centrifugal force, against the spring force, in a position of operation in which it is outwardly and downwardly inclined with respect to a plane normal to the rotational axis of the rotor.

18. A haymaking machine as claimed in claim 12 and comprising a draw beam having a rear end and a adapted to be pivotally connected to a coupling frame for the three point lifting device of an agricultural tractor, a supporting beam having a center fastened to said draw beam rear end, said rotors being mounted on the ends of said supporting beam.

19. A haymaking machine as claimed in claim 18 and further comprising mounted between an intermediate point of the draw beam and a side of the coupling fame, said tube containing pretensioned springs for admitting dampened swinging movements of the draw beam from a central position to both sides.

20. A haymaking machine as claimed in claim 19, comprising a latch for immobilizing the telescopic tube.

21. A haymaking machine as claimed in claim 12, in which a swath board is mounted laterally outwardly of the rearward rotor so as to extend in the direction of movement.

22. A haymaking machine as claimed in claim 21, in which a second swathboard extends substantially radially from the rearward rotor.

23. A haymaking machine as claimed in claim 21 in which said swathboard is adjustable mounted.

* * * * *